(12) United States Patent
Anakwenze

(10) Patent No.: US 11,457,636 B2
(45) Date of Patent: Oct. 4, 2022

(54) CUPCAKE BAKING ASSEMBLY

(71) Applicant: Agatha Anakwenze, Florence, AL (US)

(72) Inventor: Agatha Anakwenze, Florence, AL (US)

( * ) Notice: Subject to any disclaimer, the term of this patent is extended or adjusted under 35 U.S.C. 154(b) by 368 days.

(21) Appl. No.: 16/669,615

(22) Filed: Oct. 31, 2019

(65) Prior Publication Data

US 2021/0127689 A1    May 6, 2021

(51) Int. Cl.
| | |
|---|---|
| *A47J 36/16* | (2006.01) |
| *A47J 37/01* | (2006.01) |
| *A21B 3/13* | (2006.01) |
| *A21B 5/02* | (2006.01) |
| *A47J 27/04* | (2006.01) |
| *A21B 5/00* | (2006.01) |

(52) U.S. Cl.
CPC .............. *A21B 3/132* (2013.01); *A21B 3/131* (2013.01); *A21B 5/00* (2013.01); *A47J 27/04* (2013.01); *A47J 36/16* (2013.01); *A47J 37/01* (2013.01); *A47J 2027/043* (2013.01)

(58) Field of Classification Search
CPC ......... A21B 5/02–026; A21B 3/13–138; A47J 27/21; A47J 27/04; A47J 36/16; A47J 36/18; A47J 36/20; A47J 37/01
See application file for complete search history.

(56) References Cited

U.S. PATENT DOCUMENTS

| | | | |
|---|---|---|---|
| 2,469,778 A | 5/1949 | Morici | |
| 2,622,591 A | 12/1952 | Bramberry | |
| 5,191,830 A * | 3/1993 | Jacobson | A21B 3/132 249/120 |
| 5,988,045 A | 11/1999 | Housley | |
| 7,150,221 B2 * | 12/2006 | Morgan | A21B 3/13 99/428 |
| D797,492 S | 9/2017 | Shieh | |
| 10,182,681 B1 * | 1/2019 | Hart | A21D 13/32 |
| 10,575,678 B1 * | 3/2020 | Anderson | A47J 37/01 |
| 2005/0072315 A1 | 4/2005 | Romero | |
| 2008/0206437 A1 | 8/2008 | Perry | |
| 2011/0031375 A1 * | 2/2011 | Powell | A21B 3/131 249/112 |
| 2011/0056957 A1 | 3/2011 | Cheng | |
| 2015/0034664 A1 * | 2/2015 | Baecher | A21B 3/135 220/780 |

* cited by examiner

Primary Examiner — Michael A LaFlame, Jr.

(57) ABSTRACT

A cupcake baking assembly for cooking without aluminum foil includes a pot that is fillable with water thereby facilitating the water to be boiled in the pot. In this way the water is converted to steam for cooking. A cup insert is removably positionable on the pot to be heated by the steam for cooking. A lid is positionable on the cup insert when the cup insert is positioned on the pot. A plurality of cups is provided and each of the cups is fillable with a fluid food material. Each of the cups is insertable into the cup insert. Additionally, each of the cups is comprised of a thermally conductive material such that each of the cups is in thermal communication the cup insert. In this way each of the cups cooks the fluid food material contained therein.

6 Claims, 4 Drawing Sheets

CUPCAKE BAKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to baking devices and more particularly pertains to a new baking device for cooking without aluminum foil.

(2) Description of Related Art Including Information Disclosed Under 37 CFR 1.97 and 1.98

The prior art relates to baking devices.

BRIEF SUMMARY OF THE INVENTION

An embodiment of the disclosure meets the needs presented above by generally comprising a pot that is fillable with water thereby facilitating the water to be boiled in the pot. In this way the water is converted to steam for cooking. A cup insert is removably positionable on the pot to be heated by the steam for cooking. A lid is positionable on the cup insert when the cup insert is positioned on the pot. A plurality of cups is provided and each of the cups is fillable with a fluid food material. Each of the cups is insertable into the cup insert. Additionally, each of the cups is comprised of a thermally conductive material such that each of the cups is in thermal communication the cup insert. In this way each of the cups cooks the fluid food material contained therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
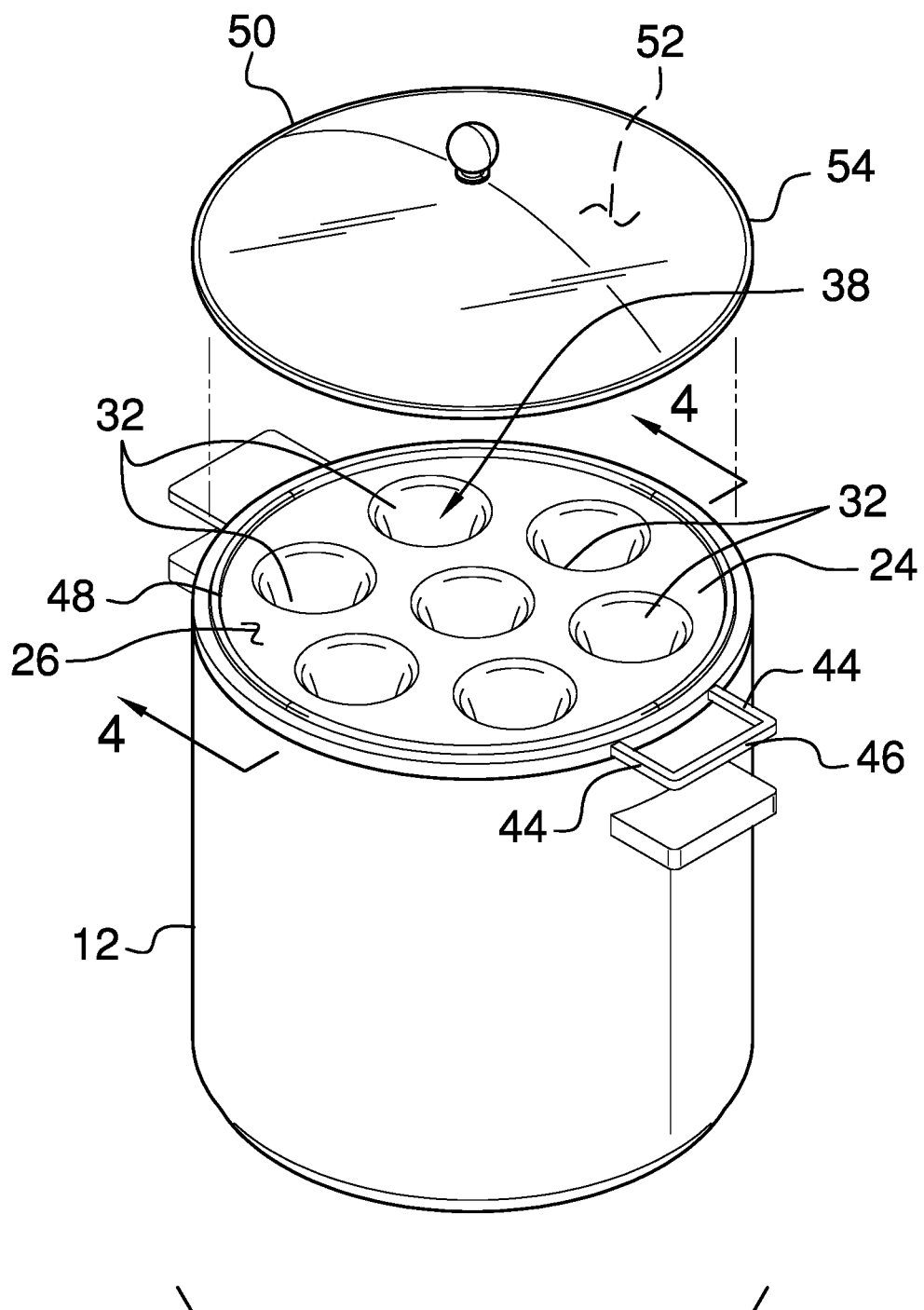
FIG. 1 is an exploded perspective view of a cupcake baking assembly according to an embodiment of the disclosure.
Figure 2:
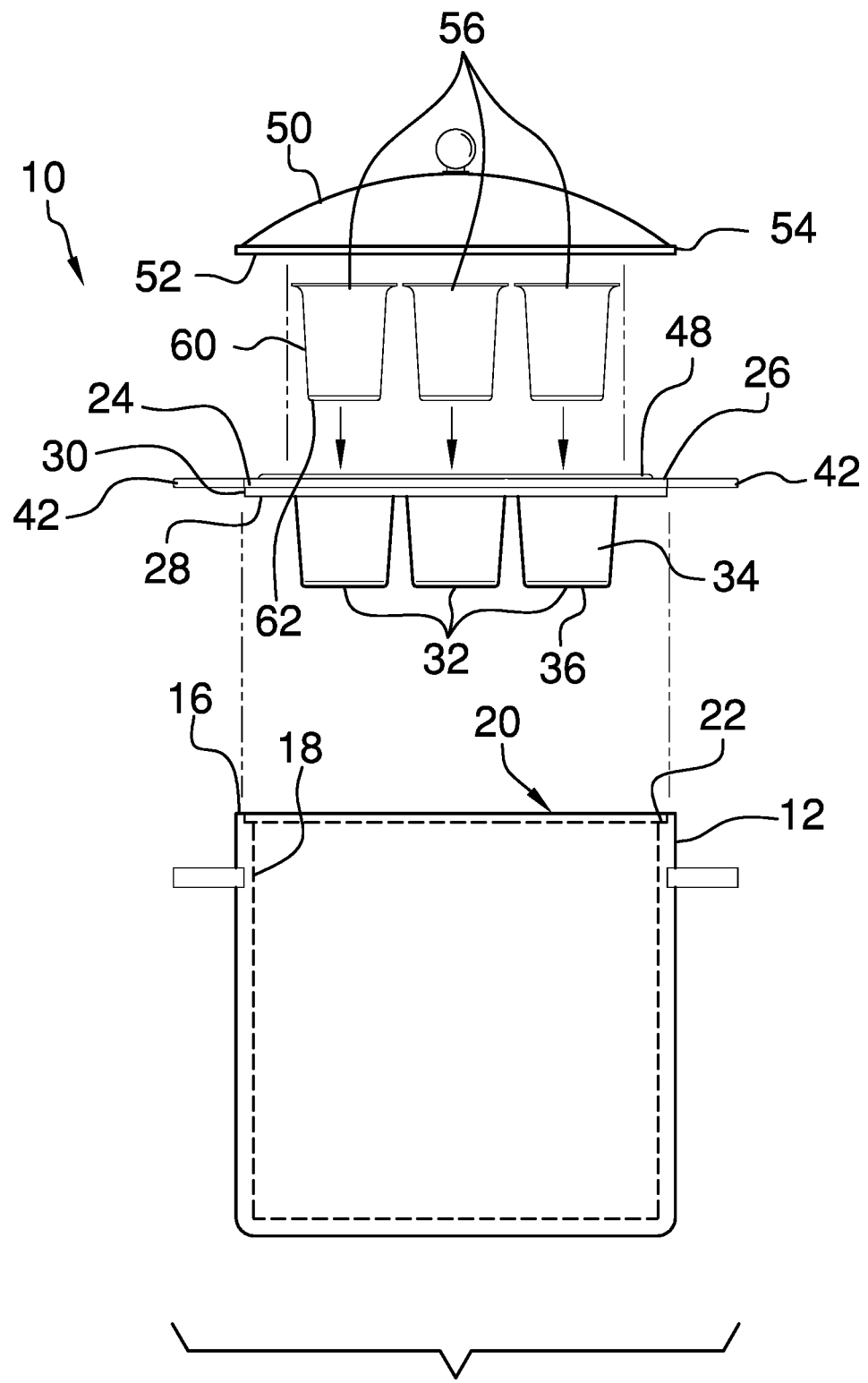
FIG. 2 is an exploded phantom view of an embodiment of the disclosure.
Figure 3:
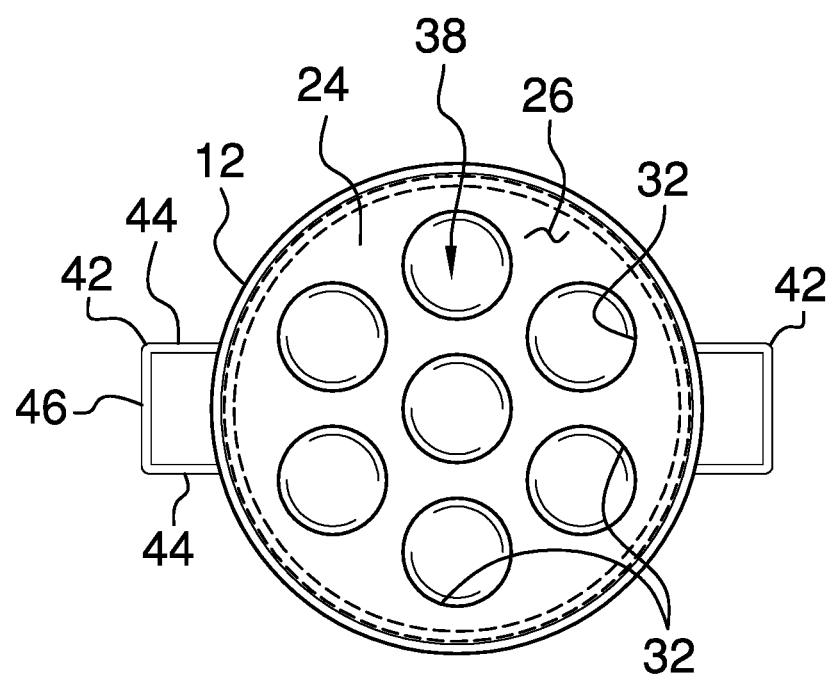
FIG. 3 is a top view of an embodiment of the disclosure.
Figure 4:
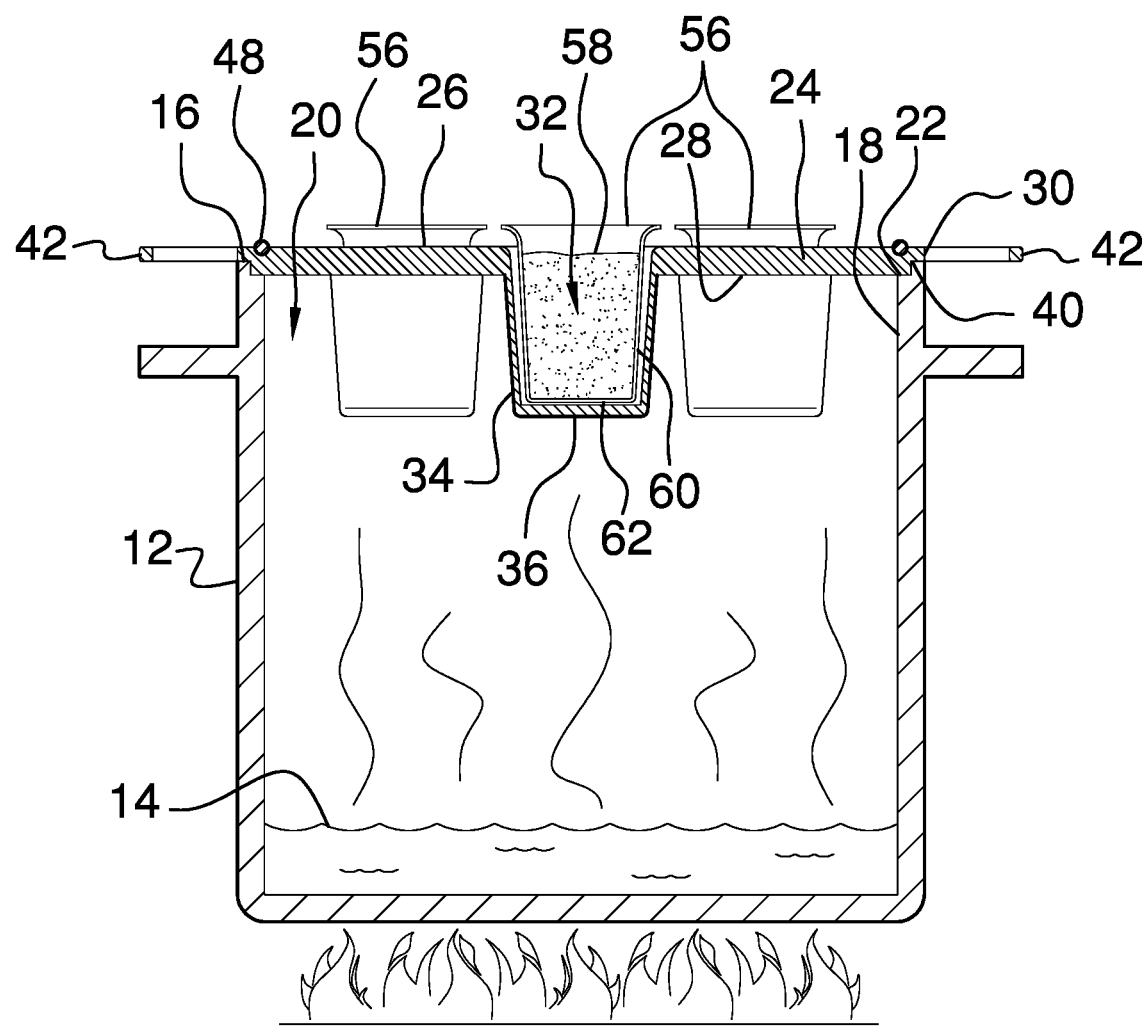
FIG. 4 is a cross sectional view taken along line 4-4 of FIG. 1 of an embodiment of the disclosure.

With reference now to the drawings, and in particular to FIGS. 1 through 4 thereof, a new baking device embodying the principles and concepts of an embodiment of the disclosure and generally designated by the reference numeral 10 will be described.

As best illustrated in FIGS. 1 through 4, the cupcake baking assembly 10 generally comprises a pot 12 that is fillable with water 14 thereby facilitating the water 14 to be boiled in the pot 12. In this way the water 14 is converted to steam for cooking. The pot 12 has a top edge 16 and inside surface 18, and the top edge 16 is circular to define an opening 20 into the pot 12. The top edge 16 has a recess 22 extending downwardly therein. The recess 22 is coextensive with the top edge 16 and the recess 22 is positioned adjacent to an intersection between the top edge 16 and the inside surface 18 of the pot 12. The pot 12 is comprised of a thermally conductive material, including but not being limited to, steel, iron or other similar rigid material. The pot 12 may range in volume between 8.0 quarts and 12.0 quarts.

A cup insert 24 is removably positionable on the pot 12 and the cup insert 24 is heated by the steam for cooking. The cup insert 24 is comprised of a thermally conductive material. The cup insert 24 has a top surface 26, a bottom surface 28 and an outer edge 30 extending therebetween. The outer edge 30 is continuously arcuate about a center of the cup insert 24 such that the cup insert 24 has a disk shape. Additionally, the cup insert 24 has a plurality of cup wells 32 each being integrated therein. Each cup well 32 is defined by an outer wall 34 extending downwardly from the bottom surface 28 and a basal wall 36 being spaced downwardly from the bottom surface 28. The cup wells 32 are spaced apart from each other and are distributed around the cup insert 24. Each of the cup wells 32 has an opening 38 extending through the top surface 26 of the cup insert 24.

The bottom surface 28 of the cup insert 24 has as a groove 40 extending upwardly therein. The groove 40 is aligned with and is coextensive with the outer edge 30 of the cup insert 24. The top edge 16 of the pot 12 is positioned in the groove 40 when the cup insert 24 is positioned on the pot 12. Moreover, the bottom surface 28 of the cup insert 24 rests in the recess 22 in the pot 12 when the cup insert 24 is positioned on the pot 12.

A pair of grips 42 is each coupled to and extends away from the cup insert 24 for gripping thereby facilitating the cup insert 24 to be placed in the pot 12 or removed from the pot 12. Each of the grips 42 is positioned on the outer edge 30 of the cup insert 24. Each of the grips 42 includes a pair of first members 44 each extending away from the outer edge 30 and a second member 46 extending between each of the first members 44. The second member 46 of each of the grips 42 is spaced from the outer edge 30 of the cup insert 24 for gripping.

A gasket 48 is coupled to the top surface 26 of the cup insert 24 and the gasket 48 is coextensive with the outer edge 30 of the cup insert 24. The gasket 48 is spaced inwardly from the outer edge 30 and the gasket 48 is comprised of a resiliently compressible material. A lid 50 is positionable on the cup insert 24 when the cup insert 24 is positioned on the pot 12. The lid 50 has a lower surface 52 and an outermost edge 54. The gasket 48 engages the lower surface 52 when the lid 50 is positioned on the cup insert 24. Additionally, the gasket 48 forms a fluid impermeable seal with the lid 50 to inhibit the steam from escaping the pot 12.

A plurality of cups 56 is provided and each of the cups 56 is fillable with a fluid food material 58. The fluid food material 58 may be black eye bean pudding, otherwise known as moi-moi, or any other type of pudding, batter or paste. Each of the cups 56 is insertable into a respective one of the cup wells 32 in the cup insert 24. Additionally, each of the cups 56 is comprised of a material that does not contain aluminum. In the existing method of cooking moi-moi, aluminum foil is used. Aluminum is known to potentially release toxic particles when the aluminum is exposed to heat. The cups 56 facilitate a means of cooking moi-moi that does not involve the dangers of cooking with aluminum.

Each of the cups 56 has an outside wall 60 and a bottom wall 62. The bottom wall 62 of each of the cups 56 rests on the basal wall 36 of the respective cup well 32 when the cups 56 are positioned therein. Additionally, each of the cups 56 is comprised of a thermally conductive material, including but not being limited to, ceramic, glass, steel, iron or any other rigid material that does not contain aluminum. Thus, each of the cups 56 is in thermal communication with the basal wall 36 of the respective cup wall wherein each of the cups 56 is configured to cook the fluid food material 58 contained therein.

In use, a sufficient amount of water 14 for boiling is poured into the pot 12 and the cup insert 24 is positioned on top of the pot 12. The pot 12 is positioned on a stove or other heat source to boil the water 14. The fluid food material 58 is poured into each of the cups 56, and each of the cups 56 is subsequently placed into the respective cup well 32. The lid 50 is positioned on the cup insert 24 and the steam from boiling the water 14 cooks the fluid food material 58. In this way moi-moi, or any other similar type of food product, can be cooked without the use of aluminum foil.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cupcake baking assembly being configured to bake cupcakes without the use of aluminum foil, said assembly comprising:

a pot being fillable with water thereby facilitating the water to be boiled in said pot wherein said water is configured to be converted to steam for cooking, wherein said pot has a top edge and inside surface, said top edge being circular to define an opening into said pot, said top edge having a recess extending downwardly therein, said recess being coextensive with said top edge, said recess being positioned adjacent to an intersection between said top edge and said inside surface of said pot;

a cup insert being removably positionable on said pot wherein said cup insert is configured to be heated by the steam for cooking, said cup insert being comprised of a thermally conductive material, said cup insert having a plurality of cup wells each being integrated therein, wherein said cup insert has a top surface, a bottom surface and an outer edge extending therebetween, said outer edge being continuously arcuate about a center of said cup insert such that said cup insert has a disk shape, each said cup wells being defined by an outer wall extending downwardly from said bottom surface and a basal wall, said cup wells being spaced apart from each other and being distributed around said cup insert, each of said cup wells having an opening extending through said top surface of said cup insert;

a lid being positionable on said cup insert when said cup insert is positioned on said pot; and a plurality of cups, each of said cups being fillable with a fluid food material, each of said cups being insertable into a respective one of said cup wells in said cup insert, each of said cups being comprised of a thermally conductive material such that each of said cups is in thermal communication said respective cup well wherein each of said cups is configured to cook the fluid food material contained therein, wherein each of said cups has an outside wall and a bottom wall, said bottom wall of each of said cups resting on said basal wall of said respective cup well when said cups are positioned therein, said outside wall being evenly spaced from said outer wall of said respective cup well when each of said cups is centered in said respective cup well, said outside wall of each said cup having an upper curved portion wherein each cup flares outwardly to a top edge of said outside wall of said cup such that said top edge is positioned vertically spaced above said top surface of said cup insert.

2. The assembly according to claim 1, wherein said bottom surface has a groove extending upwardly therein, said groove being aligned with and being coextensive with said outer edge of said cup insert, said top edge of said pot being positioned in said groove when said cup insert is positioned on said pot, said bottom surface of said cup insert resting in said recess in said pot when said cup insert is positioned on said pot.

3. The assembly according to claim 2, further comprising a pair of grips, each of said grips being coupled to and extending away from said cup insert for gripping thereby facilitating said cup insert to be placed in said pot or removed from said pot, each of said grips being positioned on said outer edge of said cup insert, each of said grips including a pair of first members each extending away from said outer edge and a second member extending between each of said first members, said second member of each of said grips being spaced from said outer edge of said cup insert for gripping.

4. The assembly according to claim 1, further comprising a gasket being coupled to said top surface of said cup insert, said gasket being coextensive with said outer edge of said cup insert, said gasket being spaced inwardly from said outer edge.

5. The assembly according to claim 1, wherein said lid has a lower surface and an outermost edge, gasket engaging said lower surface when said lid is positioned on said cup insert, said gasket forming a fluid impermeable seal with said lid wherein said lid is configured to inhibit the steam from escaping said pot.

6. A cupcake baking assembly being configured to bake cupcakes without the use of aluminum foil, said assembly comprising:
- a pot being fillable with water thereby facilitating the water to be boiled in said pot wherein said water is configured to be converted to steam for cooking, said pot having a top edge and inside surface, said top edge being circular to define an opening into said pot, said top edge having a recess extending downwardly therein, said recess being coextensive with said top edge, said recess being positioned adjacent to an intersection between said top edge and said inside surface of said pot;
- a cup insert being removably positionable on said pot wherein said cup insert is configured to be heated by the steam for cooking, said cup insert being comprised of a thermally conductive material, said cup insert having a top surface, a bottom surface and an outer edge extending therebetween, said outer edge being continuously arcuate about a center of said cup insert such that said cup insert has a disk shape, said cup insert having a plurality of cup wells each being integrated therein, each said cup wells being defined by an outer wall extending downwardly from said bottom surface and a basal wall, said cup wells being spaced apart from each other and being distributed around said cup insert, each of said cup wells having an opening extending through said top surface of said cup insert, said bottom surface having a groove extending upwardly therein, said groove being aligned with and being coextensive with said outer edge of said cup insert, said top edge of said pot being positioned in said groove when said cup insert is positioned on said pot, said bottom surface of said cup insert resting in said recess in said pot when said cup insert is positioned on said pot;
- a pair of grips, each of said grips being coupled to and extending away from said cup insert for gripping thereby facilitating said cup insert to be placed in said pot or removed from said pot, each of said grips being positioned on said outer edge of said cup insert, each of said grips including a pair of first members each extending away from said outer edge and a second member extending between each of said first members, said second member of each of said grips being spaced from said outer edge of said cup insert for gripping;
- a gasket being coupled to said top surface of said cup insert, said gasket being coextensive with said outer edge of said cup insert, said gasket being spaced inwardly from said outer edge;
- a lid being positionable on said cup insert when said cup insert is positioned on said pot, said lid having a lower surface and an outermost edge, gasket engaging said lower surface when said lid is positioned on said cup insert, said gasket forming a fluid impermeable seal with said lid wherein said lid is configured to inhibit the steam from escaping said pot; and
- a plurality of cups, each of said cups being fillable with a fluid food material, each of said cups being insertable into a respective one of said cup wells in said cup insert, each of said cups having a outside wall and a bottom wall, said bottom wall of each of said cups resting on said basal wall of said respective cup well when said cups are positioned therein, said outside wall being evenly spaced from said outer wall of said respective cup well when each of said cups is centered in said respective cup well, said outside wall of each said cup having an upper curved portion wherein each cup flares outwardly to a top edge of said outside wall of said cup such that said top edge is positioned vertically spaced above said top surface of said cup insert, each of said cups being comprised of a thermally conductive material such that each of said cups is in thermal communication with said basal wall of said respective cup wall wherein each of said cups is configured to cook the fluid food material contained therein.

* * * * *